US012698712B1

(12) United States Patent
Burdgick et al.

(10) Patent No.: US 12,698,712 B1
(45) Date of Patent: Aug. 4, 2026

(54) ROTOR ASSEMBLY HAVING A CLOSURE GROUP OF ROTOR BLADES WITH FIXTURING AND ALIGNMENT FEATURES

(71) Applicant: GE Vernova Infrastructure Technology LLC, Greenville, SC (US)

(72) Inventors: Steven Sebastian Burdgick, Schenectady, NY (US); Timothy Scott McMurray, Fultonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/345,308

(22) Filed: Sep. 30, 2025

(51) Int. Cl.
*F01D 5/02* (2006.01)

(52) U.S. Cl.
CPC .......... *F01D 5/021* (2013.01); *F05D 2220/31* (2013.01); *F05D 2230/64* (2013.01)

(58) Field of Classification Search
CPC . F01D 5/32; F01D 5/323; F01D 5/326; F01D 5/303; F01D 5/3038; F01D 5/22
See application file for complete search history.

(56) References Cited

U.S. PATENT DOCUMENTS 3,042,368 A * 7/1962 Cook .......................... F01D 5/32 416/216
4,781,532 A * 11/1988 Novacek ............... F01D 5/3053 29/889.21
7,921,556 B2 * 4/2011 Bracken ................ F01D 5/3053 416/216
8,657,579 B2 * 2/2014 Reno ...................... F01D 11/006 416/193 A
8,662,852 B2 * 3/2014 Bhokardole .......... F01D 5/3023 416/222
8,770,939 B2 * 7/2014 Tsukuda ................ F01D 5/3053 416/217
9,347,326 B2 5/2016 Kim et al.

FOREIGN PATENT DOCUMENTS

JP S6137402 U * 3/1986

OTHER PUBLICATIONS

Yamaguchi, Michio, "Turbine Rotor," JPH0352963Y2, the post examination publication of JP-S6137402-U, Machine Translation from JPlat (Year: 1991).*

* cited by examiner

*Primary Examiner* — Nathaniel E Wiehe
*Assistant Examiner* — Joshua R Beebe
(74) *Attorney, Agent, or Firm* — Dority & Manning, P.A.

(57) ABSTRACT

A rotor assembly includes a rotor that defines an annular slot. A closure group of rotor blades includes a first auxiliary rotor blade having a first auxiliary mounting portion that includes a first fixturing tab. The first auxiliary mounting portion partially defines a first pin hole. The closure group further includes a second auxiliary rotor blade having a second auxiliary mounting portion that includes a second fixturing tab. The second auxiliary mounting portion partially defines a second pin hole. The closure group further includes a closure rotor blade positioned in the gate portion of the annular slot between the first auxiliary rotor blade and the second auxiliary rotor blade. The closure rotor blade includes a closure mounting portion that is in contact with the first fixturing tab and the second fixturing tab. The closure rotor blade partially defines the first pin hole and the second pin hole.

20 Claims, 10 Drawing Sheets

ROTOR ASSEMBLY HAVING A CLOSURE GROUP OF ROTOR BLADES WITH FIXTURING AND ALIGNMENT FEATURES

FIELD

The present disclosure relates generally to a rotor assembly having a closure group of rotor blades with fixturing and alignment features.

BACKGROUND

Steam turbine designs generally include static nozzle assemblies that direct a flow of steam into multiple stages or rows of turbine rotor blades (or "buckets") that are connected to a rotor. First stage buckets, whether high pressure ("HP") or intermediate pressure ("IP") run at high temperatures with significant pressure drop across the stage. There are several methods by which first stage buckets are attached to the rotor. Some methods involve compacting the assembled row circumferentially and radially inserting a "closure" bucket, while twisting the closure bucket into position. Other methods involve making a "gate", or opening, within the rotor to radially insert the last bucket in the row. The twist-in designs require shims between adjacent bucket dovetails, prior to, and during installation of the closure bucket. Each method has inherent drawbacks.

An additional goal is to have a high performing bucket row with respect to flowpath disturbance. That is, flow disturbances can occur at the closure bucket due to flow ingress and flow induced eddies. Also, it is desirable for a bucket row to have minor impact on the hardware life of the rotor. Closure types using a screws or inserts cause high stress concentrations in the rotor in the area of the gate. Finally, current bucket row closure groups using any form of axial key designs have limitations restricting access for the final drilling or reaming of the keyed hole on each side of the closure bucket. The constrains are the closeness of the keyhole to the rotor rim surface and/or the axial access on the forward (upstream) side of the first stage bucket that does not allow for access to drill or ream the keyhole.

Accordingly, an improved rotor assembly and method of installing a plurality of rotor blades in a rotor is desired and would be appreciated in the art.

BRIEF DESCRIPTION

Aspects and advantages of the rotor assemblies, steam turbines, and methods in accordance with the present disclosure will be set forth in part in the following description, or may be obvious from the description, or may be learned through practice of the technology.

In accordance with one embodiment, a rotor assembly is provided. The rotor assembly includes a rotor that defines an annular slot that includes a main portion and a gate portion. The rotor assembly further includes a plurality of rotor blades positioned in the annular "circumferential" slot. The plurality of rotor blades include a standard group of rotor blades and a closure group of rotor blades. The standard group of rotor blades are positioned in the main portion of the annular slot. The closure group of rotor blades includes a first auxiliary rotor blade having a first auxiliary mounting portion that includes a first fixturing tab and flat bottom perpendicular to the closure bucket radial centerline. The first auxiliary mounting portion partially defines a first pin hole. The closure group further includes a second auxiliary rotor blade having a second auxiliary mounting portion that includes a second fixturing tab and flat bottom perpendicular to the closure bucket radial centerline. The second auxiliary mounting portion partially defines a second pin hole. The closure group further includes a closure rotor blade positioned in the gate portion of the annular slot between the first auxiliary rotor blade and the second auxiliary rotor blade. The closure rotor blade includes a closure mounting portion that is in contact with the first fixturing tab and the second fixturing tab. The closure rotor blade partially defines the first pin hole and the second pin hole.

In accordance with another embodiment, a steam turbine is provided. The a casing and a rotor assembly disposed in the casing. The rotor assembly includes a rotor that defines an annular slot that includes a main portion and a gate portion. The rotor assembly further includes a plurality of rotor blades positioned in the annular slot. The plurality of rotor blades include a standard group of rotor blades and a closure group of rotor blades. The standard group of rotor blades are positioned in the main portion of the annular slot. The closure group of rotor blades includes a first auxiliary rotor blade having a first auxiliary mounting portion that includes a first fixturing tab. The first auxiliary mounting portion partially defines a first pin hole. The closure group further includes a second auxiliary rotor blade having a second auxiliary mounting portion that includes a second fixturing tab. The second auxiliary mounting portion partially defines a second pin hole. The closure group further includes a closure rotor blade positioned in the gate portion of the annular slot between the first auxiliary rotor blade and the second auxiliary rotor blade. The closure rotor blade includes a closure mounting portion that is in contact with the first fixturing tab and the second fixturing tab. The closure rotor blade partially defines the first pin hole and the second pin hole.

In accordance with yet another embodiment, a method of installing a plurality of rotor blades in a rotor is provided. The method includes inserting each standard rotor blade in the group of standard rotor blades through a gate portion of an annular slot and into a main portion of the annular slot. The method further includes inserting a first auxiliary rotor blade through the gate portion of the annular slot and into the main portion of the annular slot. The first auxiliary rotor blade has a first auxiliary mounting portion that includes a first fixturing tab. The first auxiliary mounting portion partially defines a first pin hole. The method further includes inserting a second auxiliary rotor blade through the gate portion of the annular slot and into the main portion of the annular slot. The second auxiliary rotor blade has a second auxiliary mounting portion that includes a second fixturing tab. The second auxiliary mounting portion partially defines a second pin hole. The method further includes inserting a closure rotor blade through the gate portion until a closure mounting portion of the closure rotor blade contacts the first fixturing tab and the second fixturing tab. The closure rotor blade partially defines the first pin hole and the second pin hole.

These and other features, aspects and advantages of the present rotor assemblies, steam turbines, and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor assemblies, steam turbines, and methods, including the best mode of making and using the present systems and methods, directed to one of ordinary skill in the art, is set forth in the specification, which makes reference to the appended figures, in which.

DETAILED DESCRIPTION

Figure 1:
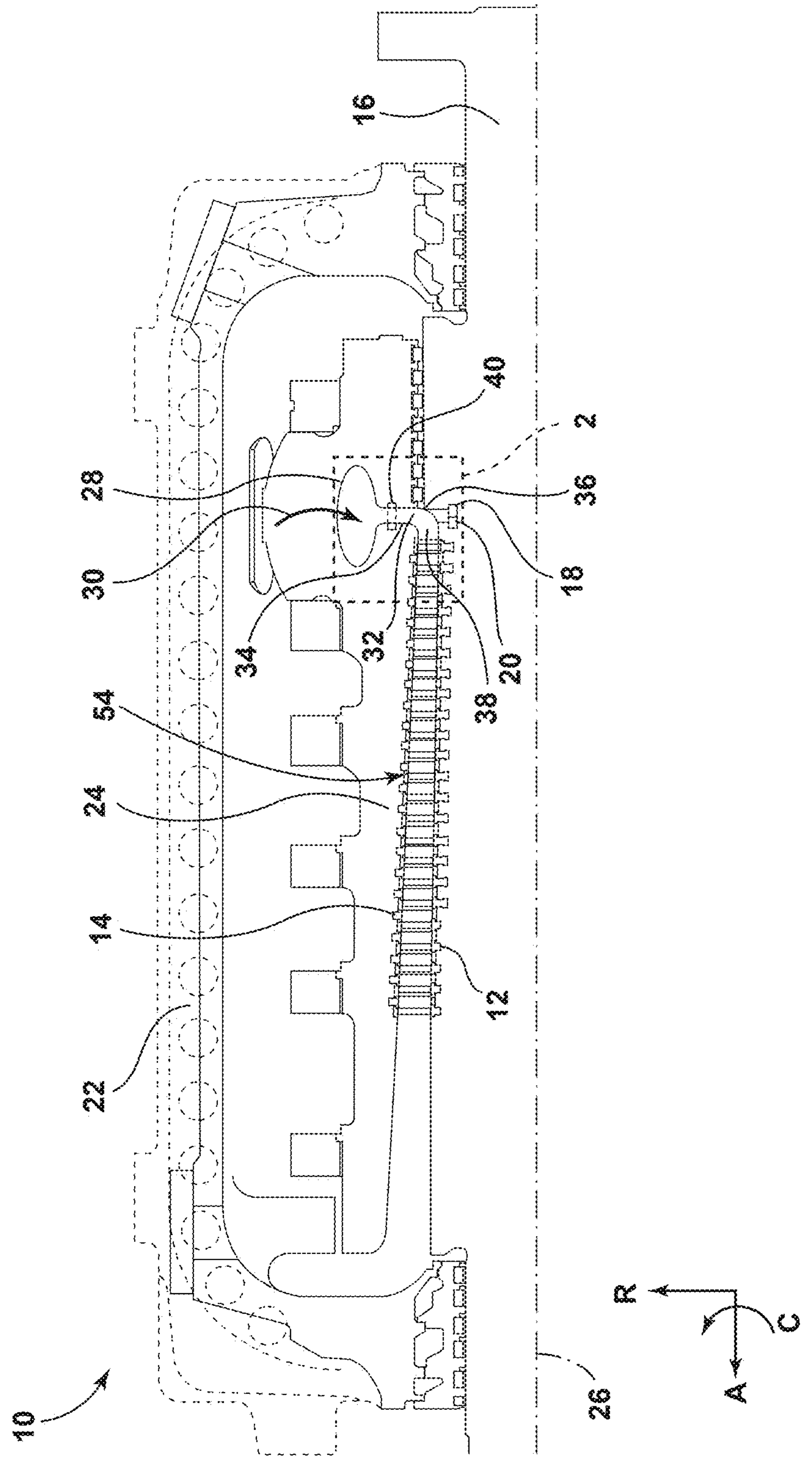
FIG. 1 is a schematic cross-sectional illustration of a steam turbine in accordance with embodiments of the present disclosure.

Reference now will be made in detail to embodiments of the present rotor assemblies, steam turbines, and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is related to a rotor assembly having a rotor and a plurality of rotor blades installed in the rotor through a gate. The rotor blades in include a closure group at least partially positioned in the gate. The closure group includes one or more features that facilitate retention of the closure group in the annular slot. The closure group, including the closure rotor blade and an auxiliary rotor blades on each side of the closure blade, may be aligned in a temporary fixture outside of the rotor for the purpose of making a final reaming operation of a keyhole. The fixture may hold the auxiliary rotor blades in the horizontal direction. The auxiliary rotor blades may have a flat bottom that may be parallel to a horizontal centerline so they could be place directly onto the base of the fixture. The closure rotor blade may be placed radially between the auxiliary rotor blades until it loads on the fixturing tab of each of the auxiliary rotor blades. The fixture may clamp horizontally (in the rotor blade circumferential direction) to assure zero gap between the closure and auxiliary rotor blade tangential faces. The final reaming of the keyhole may be done in this "off-line" assembly and then parts placed into the rotor for the pin insertion. This invention assures a self-fixturing closure group for both the off-line machining and for the final assembly installation, assuring the matched closure group assembly remains unchanged between offline machining and after installation into the rotor. An advantage of the closure group design is that it allows for "offline" drill and reaming of the cross-key closure group.

Turning now to the figures, FIG. 1 shows a section from a longitudinal cross-sectional view of a steam turbine 10, such as for example, a high pressure turbine. The steam turbine 10 may include a rotor assembly 54 that includes a rotor 16 and a plurality of rotor blades 12 (or turbine buckets) connected to the rotor 16. Additionally, the steam turbine 10 may include an outer casing 22, an inner casing 24 positioned within the outer casing 22, and a plurality of stator nozzles 14 connected to the inner casing 24. The rotor blades 12 may rotate along with the rotor 16, and the stator nozzles 14 may be stationary. That is, the steam turbine 10 may include multiple stages of rotor blades 12 and stator nozzles 14 and a non-bucketed stage groove 18 in the rotor 16 upstream of the stages of buckets and nozzles in which a insert piece assembly 20 can be placed. The rotor 16 may positioned within the within the outer casing 22 and the inner casing 24, and the rotor 16 may be rotatably mounted, such that the rotor 16 rotates about a rotational axis 26 which can also be referred to as the rotor centerline.

As shown, the steam turbine 10 may define a cylindrical coordinate system having an axial direction A that extends along the rotational axis 26. The steam turbine 10 may also define a circumferential direction C which extends around the axial direction A and the rotational axis 26. The steam turbine 10 may further define a radial direction R perpendicular to the axial direction A and the rotational axis 26.

A steam inlet 28 is disposed in the inner casing 24 to receive a supply of operating steam 30. A steam inlet passage 32 leads the steam from the steam inlet 28 to the stages of rotor blades 12 and stator nozzles 14 to form a portion of the steam flow path of the steam turbine 10. As shown in FIG. 1, the steam inlet passage 32 can include a radial extending flow portion 34, an arcuate extending flow portion 36, and an axially extending flow portion 38.

A radial nozzle row 40, also known in the art as a guide vane row, can be placed through the radial extending flow portion 34 of the steam inlet passage 32 downstream of the steam inlet 28. With the radial nozzle row 40 disposed in this location of the steam inlet passage 32, the steam 30 can travel along the arcuate extending flow portion 36 over the non-bucketed stage groove 18 and the insert piece assembly 20 and the axially extending flow portion 38 towards the stages of rotor blades 12 and stator nozzles 14 at a high flow rate. In this manner, the steam 30 flows through the stages of rotor blades 12 and stator nozzles 14 to form another portion of the steam flow path of the steam turbine 10 that is substantially axially extending and is where the steam is expanded in the turbine, which drives the rotor 16, and which may be used to drive an electric generator to produce electricity or provide heat for other purposes.

Figure 2:
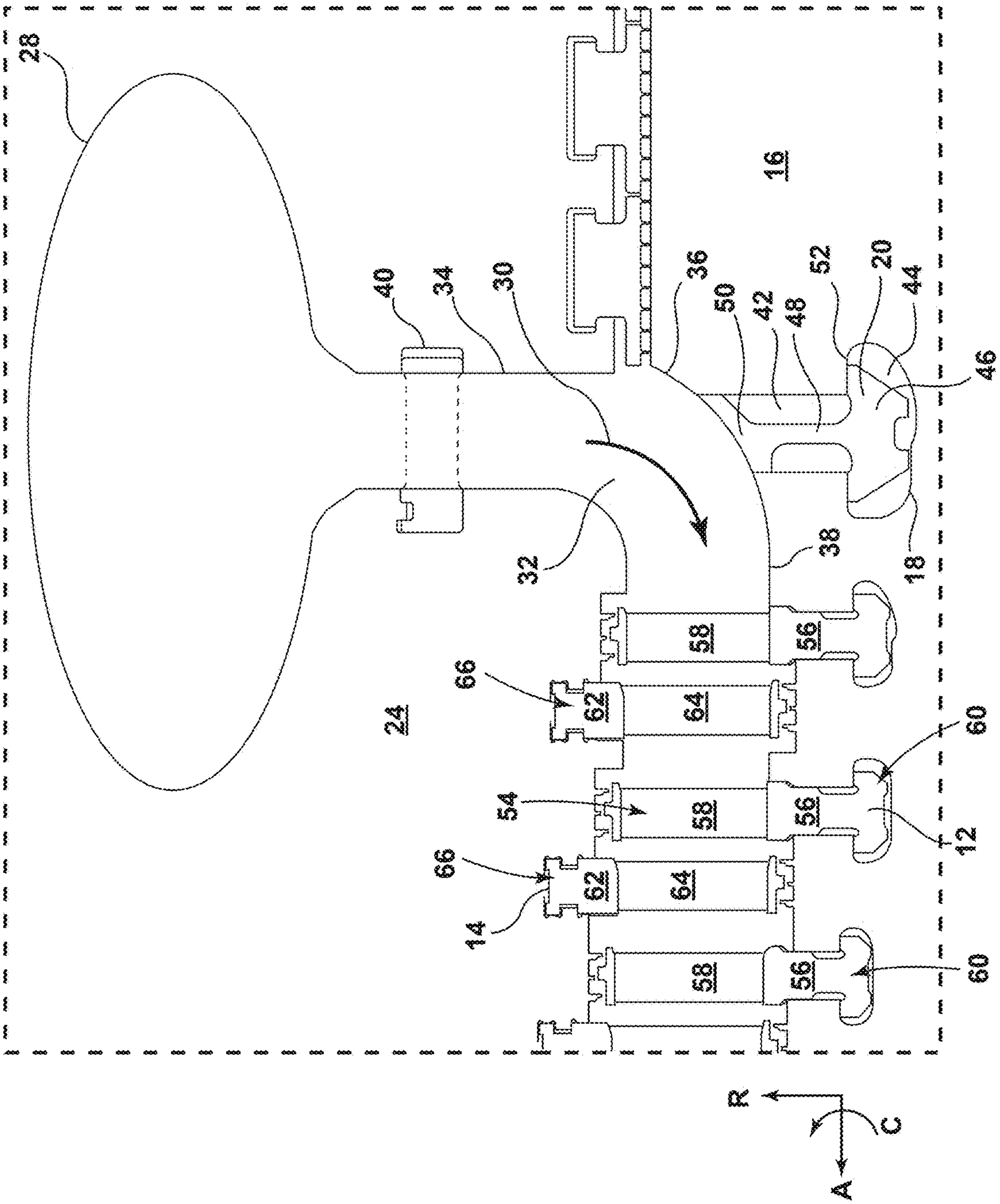
FIG. 2 illustrates an enlarged view of a portion of FIG. 1 in accordance with embodiments of the present disclosure.

FIG. 2 shows a more detailed view of the section depicted in FIG. 1 according to an embodiment of the present invention. In particular, FIG. 2 shows further details of the steam inlet 28, the steam inlet passage 32, the radial nozzle row 40, the non-bucketed stage groove 18 and the insert piece assembly 20 in the groove, and initial stages of the rotor blades 12 and the stator nozzles 14 that are downstream of the non-bucketed stage groove 18 and the insert piece assembly 20. As shown in FIG. 2, the upper radial portion of the non-bucketed stage groove 18 and insert piece assembly 20 match the arcuate shape of the abutting surface of the arcuate extending flow portion 36 of the steam inlet passage 32. FIG. 2 shows that the non-bucketed stage groove 18 can include a radial portion 42 extending inward from the surface of the arcuate extending flow portion 36 and a widen portion 44 extending axially from the radial portion 42 about the rotor 16. To this extent, the widen portion 44 is widened in comparison to the radial portion 42.

Each of the insert pieces that form the insert piece assembly 20 can include a base portion 46, which can also be referred to as a dovetail or root portion, a neck portion 48 and a cover portion 50. The insert piece assembly 20 may use dimpled or spring shims between the insert pieces forming the flowpath. The base portion 46 of the insert pieces are secured in the non-bucketed stage groove 18 under hook lands 52 established in the groove upon insertion and placement of the insert piece, such that the top surface of the cover portion 50 is substantially level with the surface of the arcuate extending flow portion 36 of the steam inlet passage 32. As shown in FIG. 2, the base portion 46, the neck portion 48, and the cover portion 50 can extend over a greater part of the radial depth of the non-bucketed stage groove 18.

As shown, the rotor blades 12 may each include a rotor mounting portion 56 and a rotor airfoil 58 extending from the rotor mounting portion 56. The rotor airfoil 58 of each rotor blade 12 may be positioned in the steam flow path. The rotor 16 may define one or more annular slots 60, and the rotor mounting portion 56 of each stage of rotor blades 12 may be positioned in a respective annular slot 60 defined in the rotor 16. Similarly, each of the stator nozzles 14 includes a stator mounting portion 62 and a stator airfoil 64 extending from the stator mounting portion 62. The inner casing 24 may define a casing slot 66. The stator airfoil 64 of each stator nozzle 14 may be positioned in the steam flow path (e.g., between two neighboring rotor blades 12). The stator mounting portion 62 of each stage of stator nozzles 14 may be positioned in a respective casing slot 66.

As mentioned above, the steam turbine 10 may include multiple stages of rotor blades 12 and stator nozzles 14. As used herein, a "first stage rotor blade" may refer to the initial set of rotor blades 12 mounted to the rotor 16, which may be the first rotor blades to engage the steam 30. Similarly, as used herein, "second stage rotor blade" may be the second set of rotor blades 12 mounted to the rotor 16 to engage the steam 30. In other words, the first stage, second stage, third stage, etc., may refer to the serial order of rotor blades (or stator nozzles) with respect to the flow direction of the steam 30. As should be appreciated, because the first stage rotor blades 12 engage the steam at the highest temperatures and pressures (when compared to other stages), this stage must include features that are robust and capable of handling the associated stresses.

Referring now to FIGS. 3 through 9, various views and/or portions of an exemplary rotor assembly 100, which includes a rotor 102 and a plurality of rotor blades 104, are illustrated in accordance with embodiments of the present disclosure. The rotor assembly 100 may be the rotor assembly 54 described above with respect to FIGS. 1 and 2. In exemplary embodiments, the plurality of rotor blades 104 described with reference to FIGS. 3 through 9 may be a plurality of first stage rotor blades. The rotor 102 may define an annular slot 186 (having a main portion 188 and a gate portion 190), and the plurality of rotor blades 104 may be positioned in the annular slot 186. The plurality of rotor blades 104 may include a standard group 106 of rotor blades 104 and a closure group 108 of rotor blades 104. The standard group 106 of rotor blades 104 may be positioned in the main portion 188 of the annular slot 186. The closure group 108 may be positioned between two rotor blades 104 in the standard group 106 of rotor blades 104.

Figure 3:
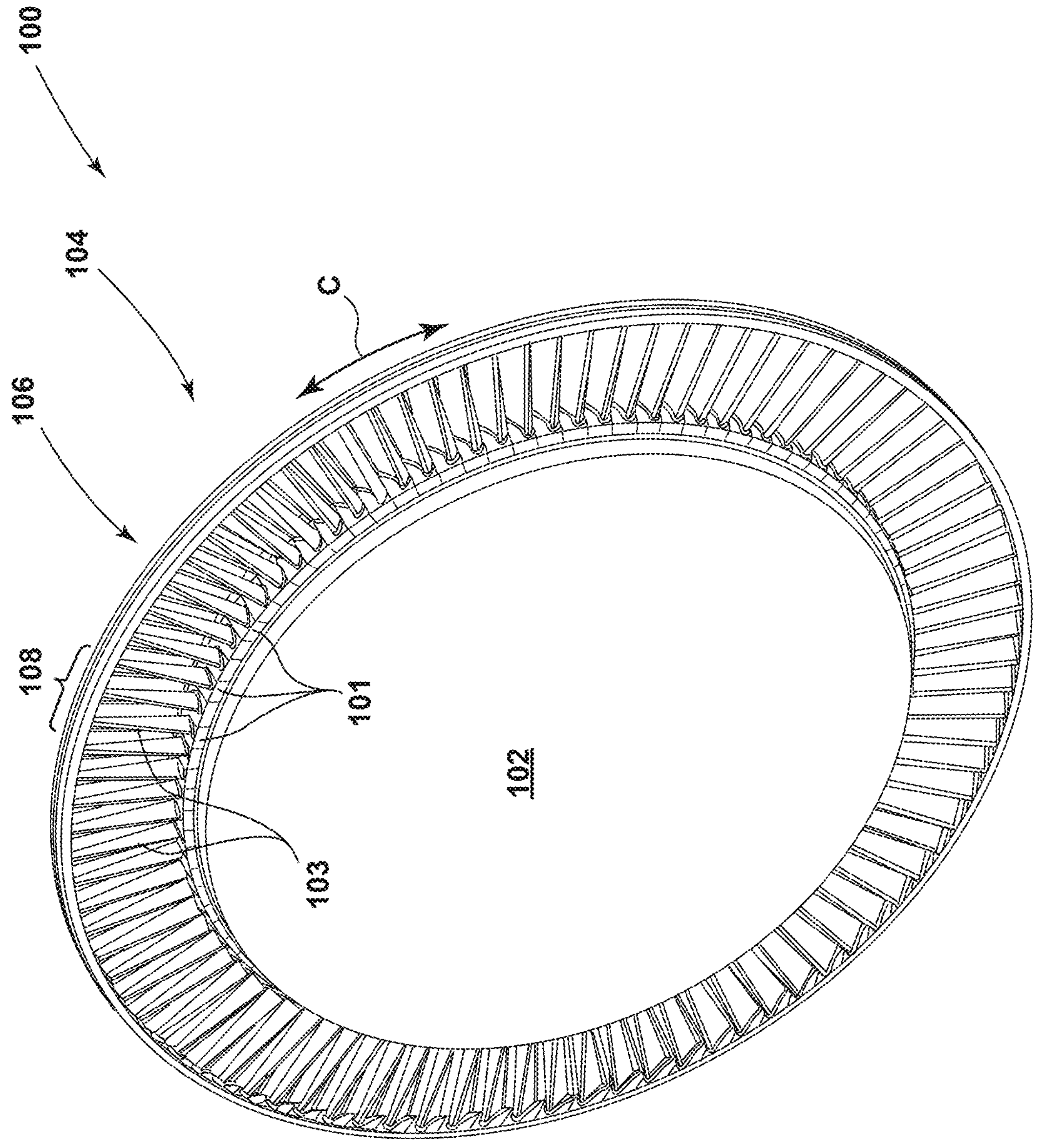
FIG. 3 is a perspective view of a complete anulus of rotor blades, which may be included in a rotor assembly, in accordance with exemplary aspects of the present disclosure.

Particularly, FIG. 3 illustrates the rotor assembly 100 in accordance with embodiments of the present disclosure. Particularly, the rotor assembly 100 includes the rotor 102 (only a portion of the rotor 102 is shown) and the plurality of rotor blades 104 connected to the rotor 102. As shown, the plurality of rotor blades 104 form a complete anulus or ring about the rotor 102. Each of the rotor blades 104 includes a mounting portion 101 for connecting to the rotor 102 and an airfoil 103 extending from the mounting portion. As shown in FIG. 3, the plurality of rotor blades 104 may include a standard group 106 of rotor blades 104 and a closure group 108 of rotor blades 104. Specifically, the standard group 106 of rotor blades 104 may include a majority of the rotor blades 104 (e.g., all but the three rotor blades 104 in the closure group 108). During installation of the rotor blades 104 into the rotor 102. The standard group 106 may be installed into the rotor 102 first. Subsequently, the closure group 108 may be installed into the rotor 102 to form the complete annulus or ring of rotor blades 104.

Figure 4:
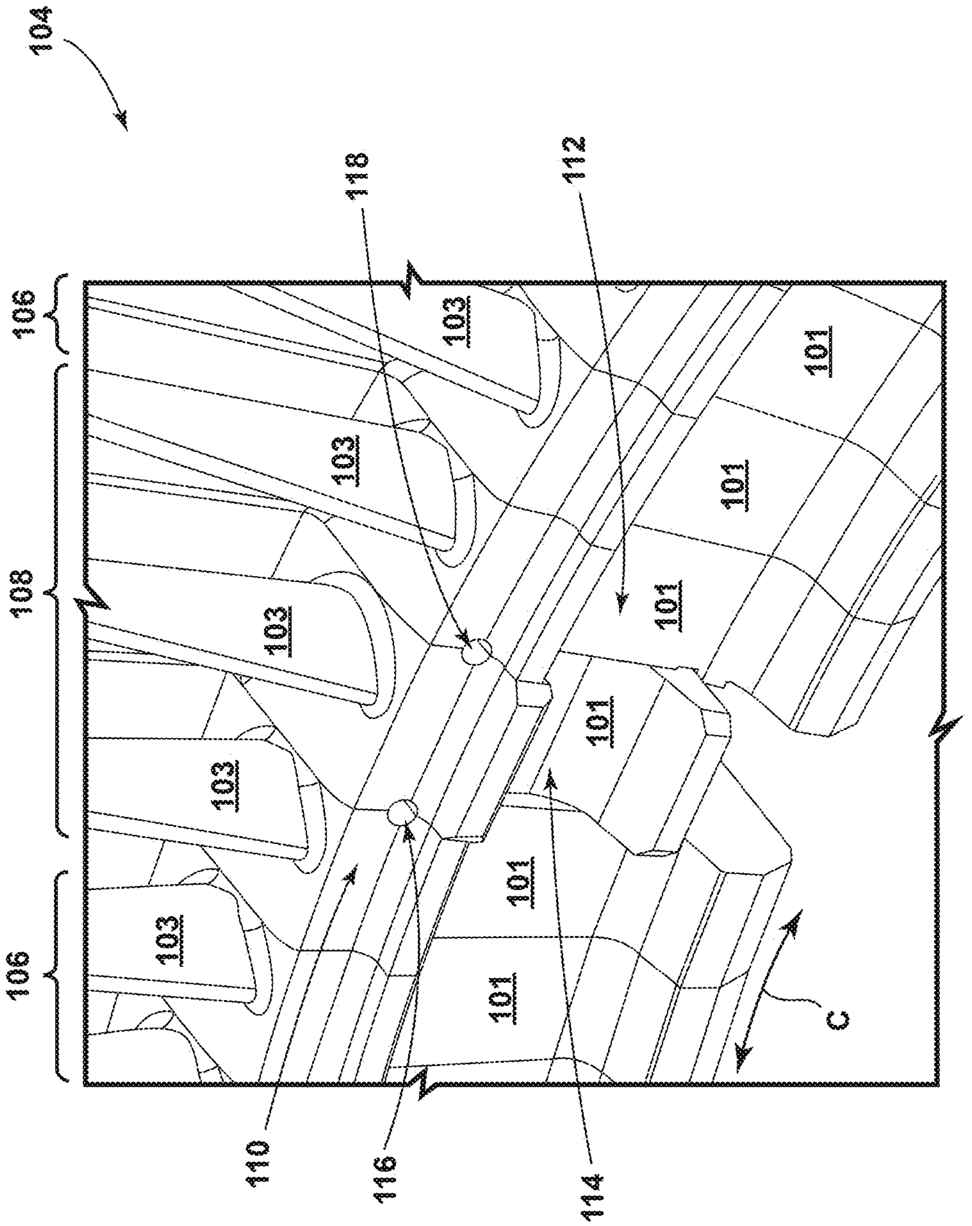
FIG. 4 illustrates an enlarged perspective view of a portion of the rotor blades, which shows details of the standard group and the closure group, in accordance with aspects of the present disclosure.

FIG. 4 illustrates an enlarged view of the plurality of rotor blades 104, including the standard group 106 and the closure group 108 of rotor blades 104. As shown, the closure group 108 of rotor blades 104 may include a first auxiliary rotor blade 110, a second auxiliary rotor blade 112, and a closure blade 114 disposed between (e.g., circumferentially between) the first auxiliary rotor blade 110 and the second auxiliary rotor blade 112. Specifically, the first auxiliary rotor blade 110 may be positioned between (e.g., circumferentially between) a rotor blade 104 in the standard group 106 and the closure blade 114. Similarly, the second auxiliary rotor blade 112 may be positioned between (e.g., circumferentially between) a rotor blade 104 in the standard group 106 and the closure blade 114. Additionally, as shown, the first auxiliary rotor blade 110 and the closure blade 114 may collectively define a first pin hole 116. Similarly, the second auxiliary rotor blade 112 and the closure blade 114 may collectively define a second pin hole 118.

Figure 5:
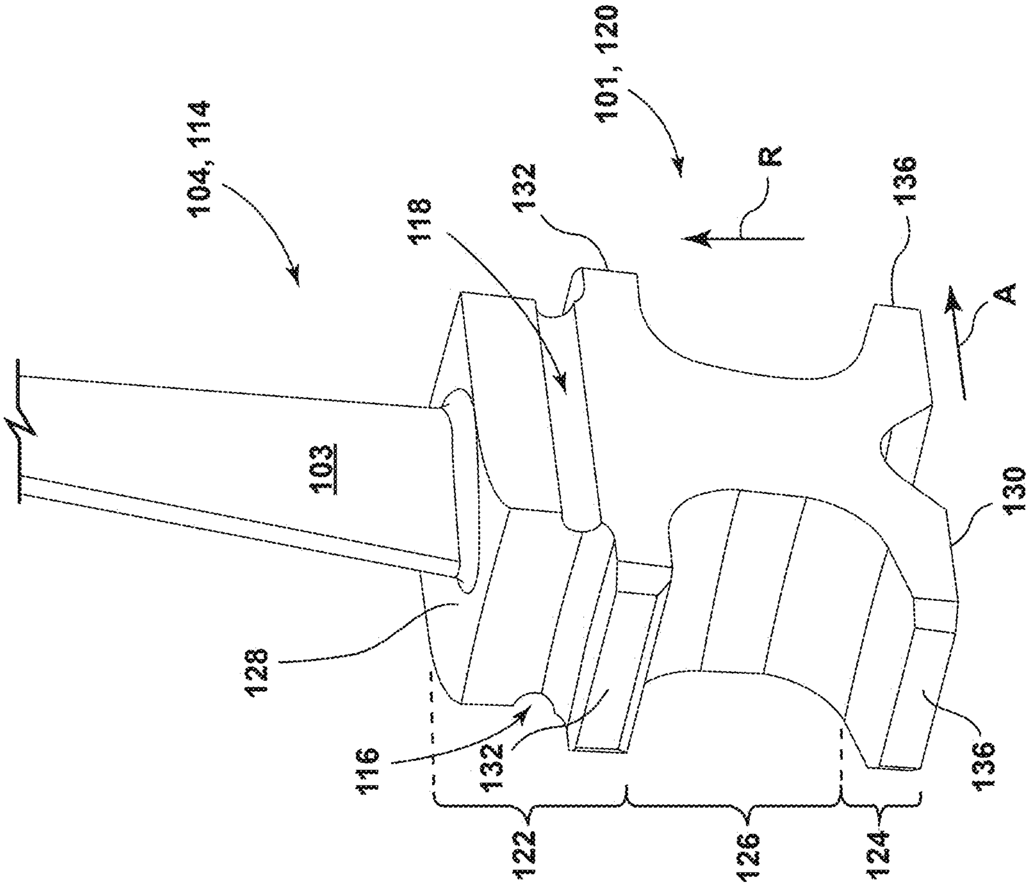
FIG. 5 illustrates a perspective view of a closure blade in accordance with embodiments of the present disclosure.
Figure 8:
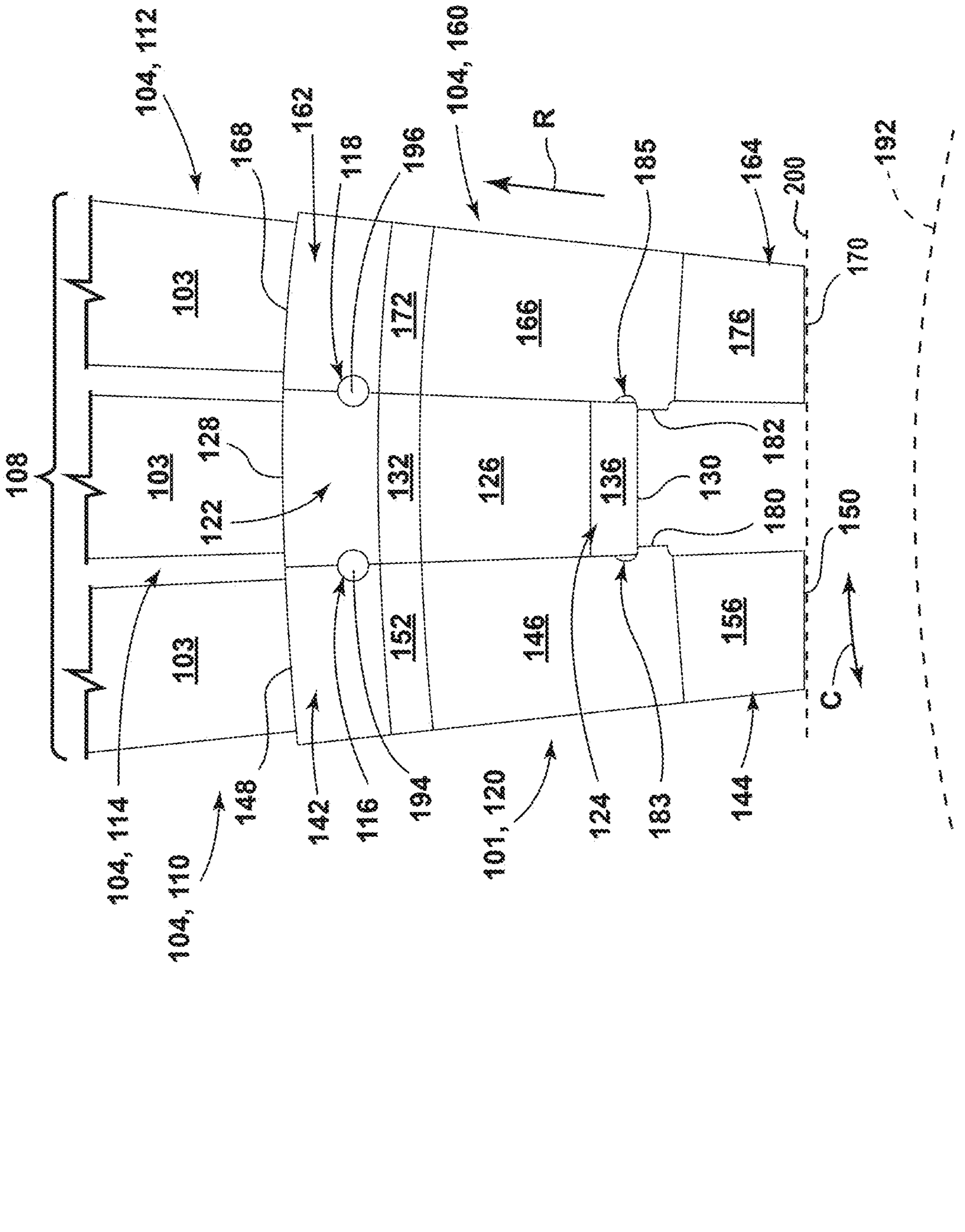
FIG. 8 illustrates a side view of a closure group of rotor blades in accordance with exemplary aspects of the present disclosure.

FIG. 5 illustrates a perspective view of the closure blade 114 in accordance with exemplary aspects of the present disclosure. Additionally, FIG. 8 illustrates, an enlarged view of the closure group 108. Further, FIG. 8 illustrates a floor 192 of the rotor 102 in phantom (i.e., a dashed line) for reference and discussion. As shown in FIGS. 5 and 8, the closure blade 114 includes the mounting portion 101 and the airfoil 103 extending from the mounting portion 101. Particularly, the mounting portion 101 may be a closure mounting portion 120, and the airfoil 103 may extend from the closure mounting portion 120. The closure mounting portion 120 may include a closure platform 122, a closure dovetail 124, and a closure neck 126 extending between the closure platform 122 and the closure dovetail 124. The closure mounting portion 120 may define a radially outer surface 128 (which may be defined by the closure platform 122). The radially outer surface 128 may define a radial flow boundary of steam, and the airfoil 103 may extend radially outwardly from the radially outer surface 128. Additionally, the closure mounting portion 120 may define a radially inner surface 130 (which may be defined by the closure dovetail 124).

The closure platform 122 may include an outer closure wings 132, which may axially engage the rotor 102 when the closure platform is installed, and also end over the rotor 102 gate cutout 190. Additionally, the closure dovetail 124 may include inner closure wings 136, which may partially define the radially inner surface 130 and axially engage the rotor 102. The outer closure wings 132 and the inner closure wings 136 may axially protrude from the closure neck 126 to engage the rotor 102 and/or the auxiliary rotor blades 110, 112. Specifically, the outer closure wings 132 may radially engage the rotor 102, and the inner closure wings 136 may radially engage the auxiliary rotor blades 110, 112 (shown in FIGS. 4, 8, and 9).

As shown, the closure mounting portion 120 partially defines the first pin hole 116 and the second pin hole 118. Specifically, the closure platform 122 may partially define the first pin hole 116 and the second pin hole 118. In other words, the first pin hole 116 and the second pin hole 118 may be defined in the closure platform 122 radially outwardly of the outer closure wings 132 and radially inwardly of the radially outer surface 128. The first pin hole 116 and the second pin hole 118 may be generally circularly shaped, such that the closure mounting portion 120 defines a half-circle portion of each of the first pin hole 116 and the second pin hole 118. In many embodiments, as shown, the first pin hole 116 and the second pin hole 118 may be elongated in the axial direction A, such that the corresponding pins may be inserted axially into the first pin hole 116 and the second pin hole 118 after the closure blade 114 is installed in the rotor 102.

Figure 6:
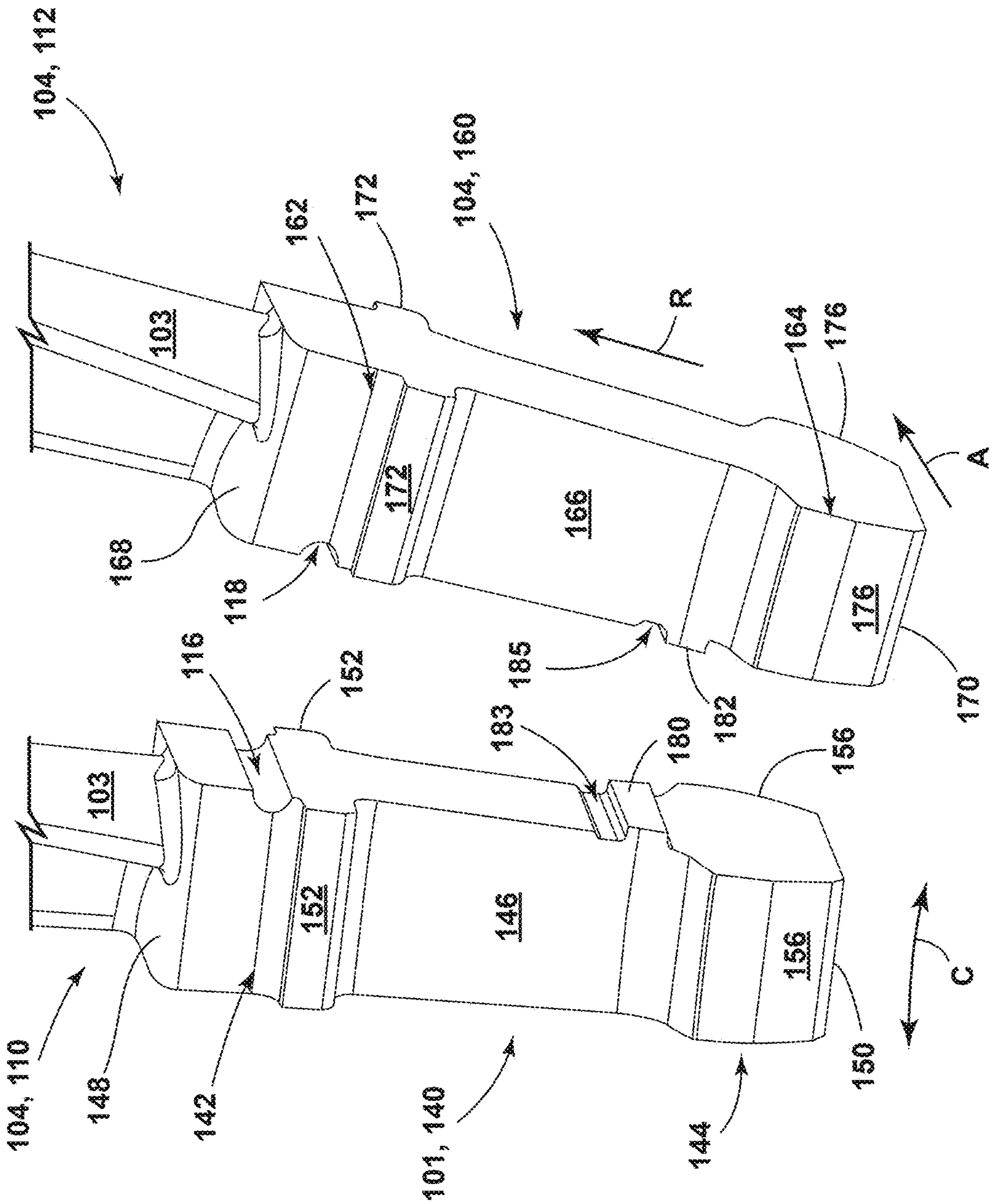
FIG. 6 illustrates a perspective view of a first auxiliary rotor blade and a second auxiliary rotor blade in accordance with embodiments of the present disclosure.

FIG. 6 illustrates an enlarged perspective view of the first auxiliary rotor blade 110 and the second auxiliary rotor blade 112 in accordance with exemplary aspects of the present disclosure. As shown in FIGS. 6 and 8, the first auxiliary rotor blade 110 and the second auxiliary rotor blade 112 each include the mounting portion 101 and the airfoil 103 extending from the mounting portion 101.

Particularly, the mounting portion 101 of the first auxiliary rotor blade 110 may be a first auxiliary mounting portion 140 for connecting the first auxiliary rotor blade 110 to the rotor 102. The first auxiliary mounting portion 140 may include a first fixturing tab 180, which may contact and support the closure blade 114 (shown in FIG. 8) during assembly only. Additionally, the first auxiliary mounting portion 140 partially defines the first pin hole 116, such that the closure blade 114 and the first auxiliary rotor blade 110 collectively define the first pin hole 116.

The first auxiliary mounting portion 140 may include a first auxiliary platform 142, a first auxiliary dovetail 144, and a first auxiliary neck portion 146 extending between the first auxiliary platform 142 and the first auxiliary dovetail 144. The first auxiliary mounting portion 140 may define a radially outer surface 148 (which may be defined by the first auxiliary platform 142). The radially outer surface 148 may define a radial flow boundary of steam, and the airfoil 103 may extend radially outwardly from the radially outer surface 148. Additionally, the first auxiliary mounting portion 140 may define a radially inner surface 150 (which may be defined by the first auxiliary dovetail 144).

Figure 9:
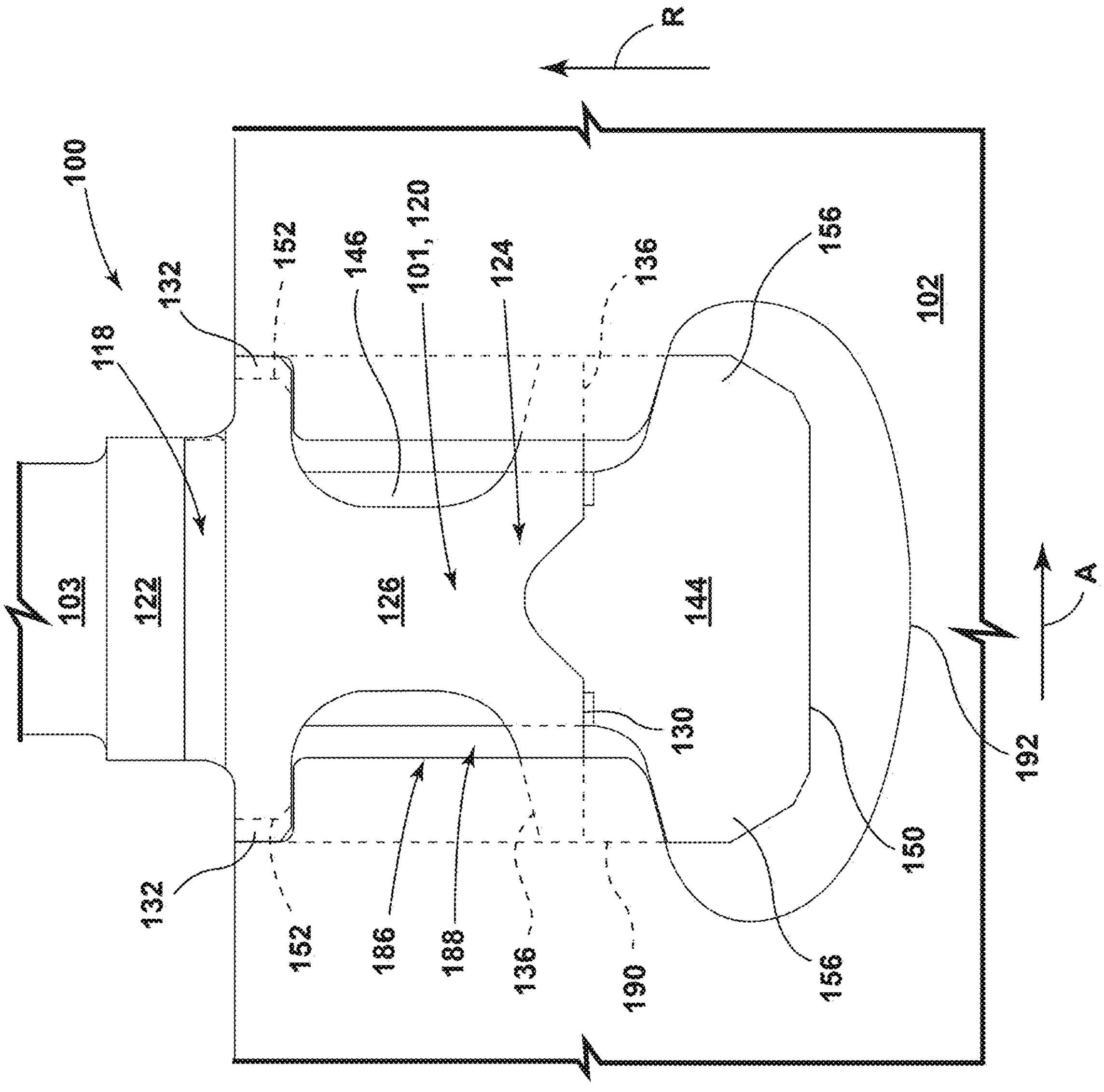
FIG. 9 illustrates a cross-sectional view of a rotor of a rotor assembly in accordance with embodiments of the present disclosure.

The first auxiliary platform 142 may include an outer auxiliary wings 152, which may axially engage the rotor 102 when the first auxiliary rotor blade 110 is installed. Additionally, the first auxiliary dovetail 144 may include inner auxiliary wings 156, which may partially define the radially inner surface 150. The outer auxiliary wings 152 and the inner auxiliary wings 156 may axially protrude from the first auxiliary neck portion 146 to engage the rotor 102. Specifically, the inner auxiliary wings 156 may radially engage the rotor 102 (as shown in FIGS. 8 and 9).

The first auxiliary platform 142 may partially define the first pin hole 116. In other words, the first pin hole 116 may be defined in the first auxiliary platform 142 radially outwardly of the outer auxiliary wings 152 and radially inwardly of the radially outer surface 148. The first pin hole 116 may be generally circularly shaped, such that the first auxiliary mounting portion 140 defines a half-circle portion of the first pin hole 116.

As shown, the first fixturing tab 180 may extend from the first auxiliary neck portion 146. Specifically, the first fixturing tab 180 may extend circumferentially from the first auxiliary neck portion 146 to provide a radial surface upon which the closure blade 114 may be supported during assembly of the axial pins 194 and 196. Additionally, in some embodiments, the first fixturing tab 180 may extend axially (and continuously) across the entire first auxiliary neck 146. In other embodiments, the first fixturing tab 180 may extend discontinuously in the axial direction, such that the first fixturing tab 180 extends only partially across the first auxiliary neck 146. In such embodiments, the first fixturing tab 180 may include may include multiple axially and tangentially extending tab portions (e.g., a first tab portion extending axially and tangentially from the first auxiliary neck 146 in a first axial location and a second tab portion extending axially and tangentially from the first auxiliary neck 146 in a second axial location). When installed, as shown in FIG. 8, the inner surface 130 of the closure mounting portion 120 may contact the first fixturing tab 180. Further, in many embodiments, a first recess 183 is defined in the first auxiliary neck portion 146 radially outwardly (e.g., directly radially outwardly) of the first fixturing tab 180. Specifically, the first recess 183 may extend circumferentially into the first auxiliary neck portion 146. The first recess 183 may extend axially (and continuously) across the entire first auxiliary neck 146.

Additionally, the mounting portion 101 of the second auxiliary rotor blade 112 may be a second auxiliary mounting portion 160 for connecting the second auxiliary rotor blade 112 to the rotor 102. The second auxiliary mounting portion 160 may include a second fixturing tab 182, which may contact and support the closure blade 114 (shown in FIG. 8). Additionally, the second auxiliary mounting portion 160 partially defines the second pin hole 118, such that the closure blade 114 and the second auxiliary rotor blade 112 collectively define the second pin hole 118.

The second auxiliary mounting portion 160 may include a second auxiliary platform 162, a second auxiliary dovetail 164, and a second auxiliary neck portion 166 extending between the second auxiliary platform 162 and the second auxiliary dovetail 164. The second auxiliary mounting portion 160 may define a radially outer surface 168 (which may be defined by the second auxiliary platform 162). The radially outer surface 168 may define a radial flow boundary of steam, and the airfoil 103 may extend radially outwardly from the radially outer surface 168. Additionally, the second auxiliary mounting portion 160 may define a radially inner surface 170 (which may be defined by the second auxiliary dovetail 164).

The second auxiliary platform 162 may include an outer auxiliary wings 172, which may radially engage the rotor 102 when the second auxiliary rotor blade 112 is installed. Additionally, the second auxiliary dovetail 164 may include inner auxiliary wings 176, which may partially define the radially inner surface 170. The outer auxiliary wings 172 and the inner auxiliary wings 176 may axially protrude from the second auxiliary neck portion 166 to engage the rotor 102. Specifically, the outer auxiliary wings 172 and the inner auxiliary wings 176 may radially engage the rotor 102 (as shown in FIGS. 8 and 9).

The second auxiliary platform 162 may partially define the second pin hole 118. In other words, the second pin hole 118 may be defined in the second auxiliary platform 162 radially outwardly of the outer auxiliary wings 172 and radially inwardly of the radially outer surface 168. The second pin hole 118 may be generally circularly shaped, such that the second auxiliary mounting portion 160 defines a half-circle portion of the second pin hole 118.

As shown, the second fixturing tab 182 may extend from the second auxiliary neck portion 166. Specifically, the second fixturing tab 182 may extend circumferentially from the second auxiliary neck portion 166 to provide a radial surface upon which the closure blade 114 may be supported. Additionally, in some embodiments, the second fixturing tab 182 may extend axially (and continuously) across the entire second auxiliary neck portion 166. In other embodiments, the second fixturing tab 182 may extend discontinuously in the axial direction, such that the second fixturing tab 182 extends only partially across the second auxiliary neck 166. In such embodiments, the second fixturing tab 182 may include may include multiple axially and tangentially extending tab portions (e.g., a first tab portion extending axially and tangentially from the second auxiliary neck 166 in a first axial location and a second tab portion extending axially and tangentially from the second auxiliary neck 166 in a second axial location). When installed, as shown in FIG. 8, the inner surface 130 of the closure mounting portion 120 may contact the second fixturing tab 182. Further, in many embodiments, a second recess 185 is defined in the second neck portion 166 radially outwardly (e.g., directly radially outwardly) of the second fixturing tab 182. Specifically, the second recess 185 may extend circumferentially into the second auxiliary neck portion 166. The second recess 185 may extend axially (and continuously) across the entire first auxiliary neck portion 166.

In this manner, once all the rotor blades 104 in the standard group 106, the first auxiliary rotor blade 110, and the second auxiliary rotor blade 112 are installed in the rotor 102, the closure blade 114 may be inserted until the closure dovetail contacts the first fixturing tab 180 and the second fixturing tab 182. Further, as shown in FIG. 8, a first pin 194 may be positioned in the first pin hole 116, and a second pin 196 may be positioned in the second pin hole 118, which secures the closure blade 114 to the neighboring rotor blades 104 and to the rotor 102.

Figure 7:
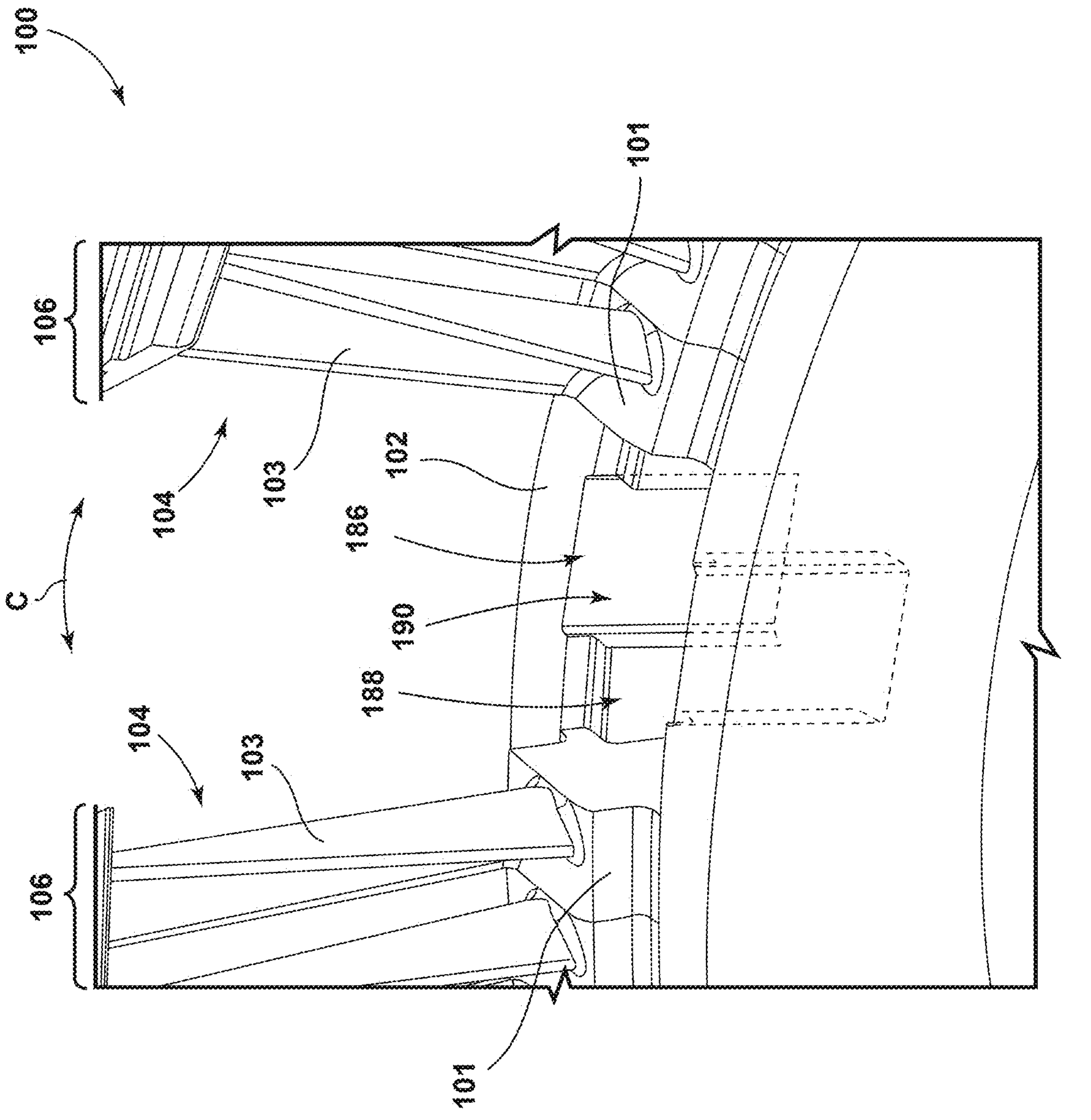
FIG. 7 illustrates a portion of a rotor assembly, in which the standard group of rotor blades is installed and the closure group is not installed, in accordance with exemplary aspects of the present disclosure.

Referring now to FIG. 7, an enlarged view of the rotor assembly 100, in which the closure group 108 is missing to show features of the rotor 102, is illustrated in accordance with embodiments of the present disclosure. As shown, the rotor 102 may define an annular slot 186, in which the plurality of rotor blades 104 may be installed (including the standard group 106 and the closure group 108). That is, the annular slot 186 may include a main portion 188 and a gate portion 190. The main portion 188 may generally correspond with the shape of the mounting portion 101 of the rotor blades 104 in the standard group 106, the first auxiliary rotor blade 110, and the second auxiliary rotor blade 112. By contrast, the gate portion 190 may be generally rectangularly shaped (e.g., a rectangular prism). In this manner, each rotor blade 104 in the standard group 106, the first auxiliary rotor blade 110, and the second auxiliary rotor blade 112 may be inserted through the gate portion 190, rotated (or twisted), and moved (or circumferentially slid) into the main portion 188 of the annular slot 186. As mentioned above, because the main portion 188 is shaped to correspond to the mounting portion 101 of each rotor blade 104 in the standard group 106, the first auxiliary rotor blade 110, and the second auxiliary rotor blade 112, these rotor blades 104 may be retained in the annular slot due to being loaded against the rotor 102. In other words, the annular slot 186 may be widened (or widest in some embodiments) at the gate portion 190, which allows the rotor blades 104 to be inserted even through the main portion 188 is too small for a direct drop-in of the rotor blades 104. After all the rotor blades in the standard group 106 are installed (as shown in FIG. 7), the first auxiliary rotor blade 110 and the second auxiliary rotor blade 112 may be installed. Lastly, the closure blade 114 may be installed in the gate portion 190.

In exemplary embodiments, as shown, the inner surface 150 of the first auxiliary rotor blade 110 and the inner surface 170 of the second auxiliary rotor blade may be mutually parallel with one another (i.e., both the inner surfaces 150 and 170 may each be planar surfaces that are parallel to one another and aligned with one another). This parallel arrangement may facilitate the offline reaming of the pin holes when the closure group 108 is arranged in a fixture prior to being installed in the rotor 102. For example, the closure group 108, including the closure rotor blade 114 and an auxiliary rotor blades 110, 112 on each side of the closure blade 114, may be aligned in a temporary fixture 200 outside of the rotor 102 for the purpose of making a final reaming operation of the pin holes 116, 118. The fixture 200 may hold the auxiliary rotor blades 110, 112 in a horizontal direction (parallel to the surfaces 150, 170). The auxiliary rotor blades 110, 112 may have the inner surfaces 150, 170 that is flat and that may be parallel to the horizontal direction so the auxiliary rotor blades 110, 112 can be place directly onto a base of the fixture 200. Subsequently, the closure rotor blade 114 may be placed radially between the auxiliary rotor blades 110, 112 until it loads on the fixturing tabs 180, 182 of each of the auxiliary rotor blades 110, 112. Although not illustrated, the fixture 200 may clamp horizontally (in the rotor blade circumferential direction) to assure zero gap between the closure and auxiliary rotor blade tangential faces. The final reaming of the pin holes 116, 118 may be done in this "off-line" assembly and then parts placed into the rotor 102 for the pin 194, 196 insertion.

Referring now to FIG. 9, a cross-sectional view of the rotor 102 is illustrated to show various details of the rotor assembly 100 in accordance with various aspects of the present disclosure. As shown, the rotor 102 defines the annular slot 186, which includes the main portion 188 (shown in solid lines) and the gate portion 190 (shown in dashed lines). As shown in FIG. 9, the closure mounting portion 120 may be positioned in the gate portion 190. Additionally, the closure mounting portion 120 may be radially smaller than the neighboring auxiliary rotor blade (e.g., the first auxiliary mounting portion 140 in the example shown in FIG. 9). In this manner, the floor 192 of the annular slot 186 may be radially spaced apart further from the closure mounting portion 120 than the neighboring auxiliary rotor mounting portion (e.g., the first auxiliary mounting portion 140). In other words, a first radial gap may be defined between the floor 192 and the inner surface 150 of the first auxiliary mounting portion 140, and a second radial gap may be defined between the floor 192 and the inner surface 130 of the closure mounting portion 120. The second radial gap may be larger than the first radial gap.

Additionally, as shown in FIG. 9, the annular slot 186 may include a dovetail segment 198 (in which the dovetail of the rotor blades in the standard group 106, the auxiliary dovetails 144, 164 are positioned), which may be partially defined by the floor 192. The gate portion 190 may be generally shaped as a rectangular prism (e.g., having a constant axial length along the radial direction). The gate portion 190 may extend radially from an outer surface of the rotor 102 to the dovetail segment 198. The closure mounting portion 120 may be positioned entirely in the gate portion 190 of the annular slot 186. The outer closure wings 132 may extend axially beyond the outer wings of the neighboring rotor blades (e.g., the outer auxiliary wings 152), in order to contact the walls of the rotor 102 within the gate portion 188.

Figure 10:
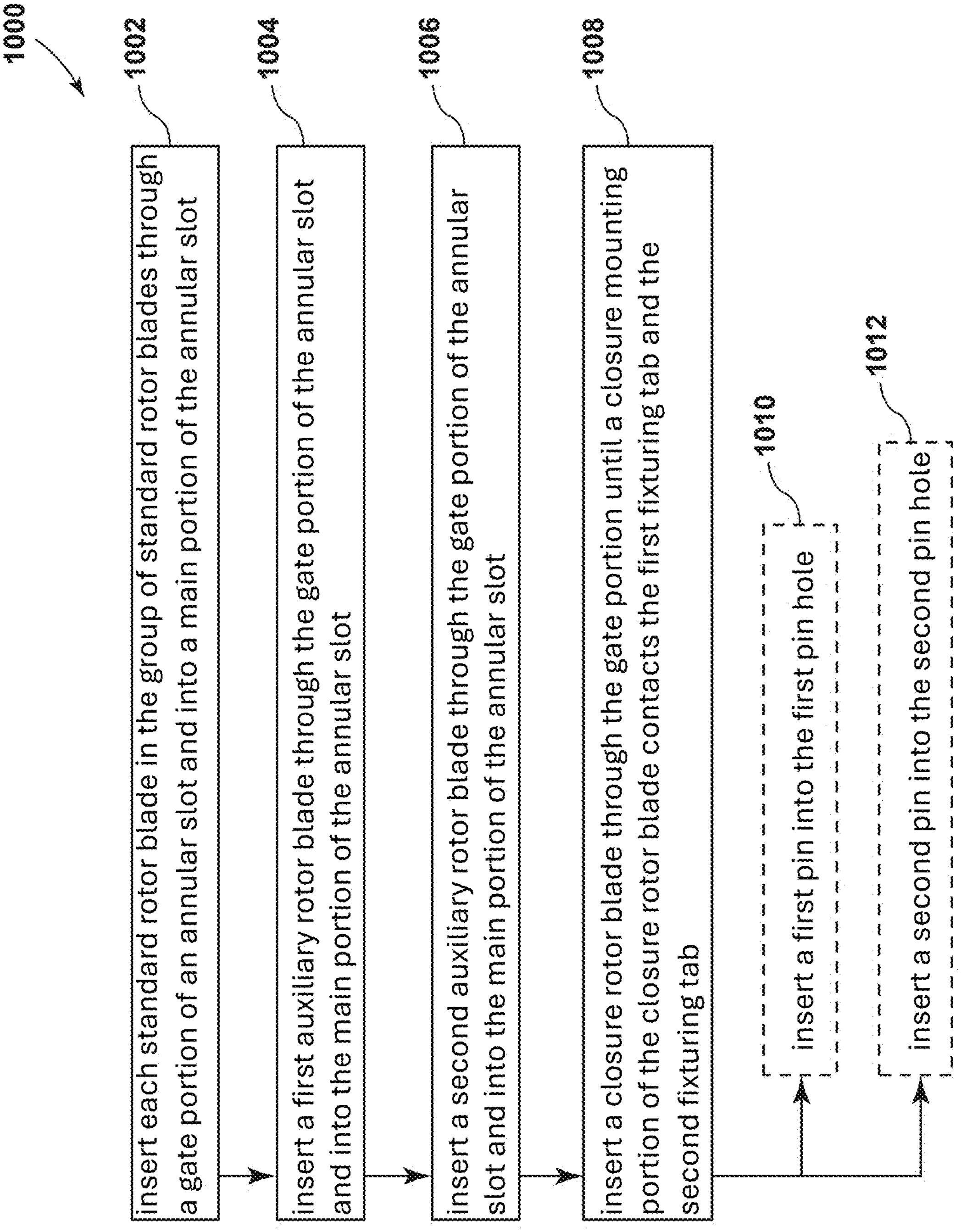
FIG. 10 is a flow chart of a method of installing a plurality of rotor blades in a rotor in accordance with embodiments of the present disclosure.

Referring now to FIG. 10, a flow diagram of one embodiment of a method 1000 of installing a plurality of rotor blades in a rotor is illustrated in accordance with embodiments of the present subject matter. In general, the method 1000 will be described herein with reference to the steam turbine 10 and the rotor assembly 100 described above with reference to FIGS. 1-9. However, it will be appreciated by those of ordinary skill in the art that the disclosed method 1000 may generally be utilized with any suitable system and/or may be utilized in connection with a system having any other suitable system configuration. In addition, although FIG. 10 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. Dashed boxes indicate optional steps.

The rotor assembly may include a standard group of rotor blades, a closure group of rotor blades, and a rotor. The method 1000 may include, at (1002) inserting each standard rotor blade in the group of standard rotor blades through a gate portion of an annular slot and into a main portion of the annular slot. Particularly, this may include inserting each of the standard rotor blades through the gate (e.g., radially inserting the rotor blades), rotating each standard rotor blades (e.g., twisting the rotor blade within the gate), and moving (or circumferentially sliding) each of the standard rotor blades into the main portion of the annular slot after the rotating step.

In exemplary implementations, the method 1000 may further include, at (1004), inserting a first auxiliary rotor blade through the gate portion of the annular slot and into the main portion of the annular slot. The first auxiliary rotor blade may include a first auxiliary mounting portion that has a first fixturing tab. Additionally, the first auxiliary mounting portion may partially defines a first pin hole. Particularly, this may include inserting the first auxiliary rotor blade through the gate (e.g., radially inserting the rotor blades), rotating first auxiliary rotor blade (e.g., twisting the rotor blade within the gate), and moving (or circumferentially sliding) the first auxiliary rotor blade into the main portion of the annular slot on a first side of the gate portion after the rotating step.

In many implementations, the method 1000 may further include, at (1006), inserting a second auxiliary rotor blade through the gate portion of the annular slot and into the main portion of the annular slot. The second auxiliary rotor blade may include a second auxiliary mounting portion that has a second fixturing tab. Additionally, the second auxiliary mounting portion may partially defines a second pin hole. Particularly, this may include inserting the second auxiliary rotor blade through the gate (e.g., radially inserting the rotor blades), rotating second auxiliary rotor blade (e.g., twisting the rotor blade within the gate), and moving (or circumferentially sliding) the second auxiliary rotor blade into the main portion of the annular slot on a second side of the gate portion after the rotating step.

The method 1000 may further include, at (1008), inserting a closure rotor blade through the gate portion until a closure mounting portion of the closure rotor blade contacts the first fixturing tab and the second fixturing tab. The closure rotor blade partially defines the first pin hole and the second pin hole. That is, once the closure mounting portion of the closure rotor blade contacts the first fixturing tab and the second fixturing tab, the closure blade may be aligned within the rotor such that the first pin hole and the second pin hole are fully defined. In many embodiments, the method 1000 may further include, at (1010), inserting a first pin into the first pin hole and, at (1012), inserting a second pin into the second pin hole. This secures the closure rotor blade to the neighboring rotor blades and to the rotor.

In many embodiments, the method may further include installing the closure group in a fixture. Installing the closure group in a fixture may include positioning an inner surface of the first auxiliary rotor blade and an inner surface of the second auxiliary rotor blade on the fixture. The inner surface of the first auxiliary rotor blade and the inner surface of the second auxiliary rotor blade are parallel, such that they may substantially contact the base of the fixture. Installing the closure group in the fixture may further include positioning the closure blade between the first auxiliary rotor blade and the second auxiliary rotor blade such that the closure blade contacts the first fixturing tab and the second fixturing tab. Once the closure group is installed in the fixture (which may include clamps for holding the closure group in place), the method may include machining the first pin hole and the second pin hole, which may be done by reaming, drilling, or other machining means.

As described above, the first fixturing tab and the second fixturing tab may be positioned on tangential faces of the auxiliary buckets. The first fixturing tab and the second fixturing tab may be tangential protrusion on the tangential face that faces the closure bucket. The closure blade has a mounting portion that is different from the remainder of the rotor blades in the row (e.g., the standard group and/or the auxiliary rotor blades). The weight reduced closure blade has a significantly shorter mounting portion in the radial direction. Both the closure rotor blade and auxiliary rotor blade would have an undersized "half-hole" machined into the tangential face, that will create the "full" hole for the closure group, to be reamed as a "matched" assembly. The closure group, including the closure rotor blade and the auxiliary rotor blades on each side of the closure, may be aligned in a temporary fixture outside of the rotor for the purpose of making a final reaming operation of the keyhole. The fixture may hold the auxiliary rotor blades in the horizontal direction. The auxiliary rotor blades may have a flat bottom that may be parallel to a horizontal centerline so they could be place directly onto the base of the fixture. The closure rotor blade may be placed radially between the auxiliary rotor blades until it loads on the fixturing tab of each of the auxiliary rotor blades. The fixture may clamp horizontally (in the rotor blade circumferential direction) to assure zero gap between the closure and auxiliary rotor blade tangential faces. The final reaming of the keyhole may be done in this "off-line" assembly and then parts placed into the rotor for the pin insertion. This invention assures a self-fixturing closure group for both the off-line machining and for the final assembly installation, assuring the matched closure group assembly remains unchanged between offline machining and after installation into the rotor. An advantage of the closure group design is that it allows for "offline" drill and reaming of the cross-key closure group.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A rotor assembly comprising: a rotor defining an annular slot that includes a main portion and a gate portion; a plurality of rotor blades positioned in the annular slot, the plurality of rotor blades including a standard group of rotor blades and a closure group of rotor blades, the standard group of rotor blades positioned in the main portion of the annular slot, and wherein the closure group of rotor blades comprises: a first auxiliary rotor blade having a first auxiliary mounting portion that includes a first fixturing tab, and wherein the first auxiliary mounting portion partially defines a first pin hole; a second auxiliary rotor blade having a second auxiliary mounting portion that includes a second fixturing tab, and wherein the second auxiliary mounting portion partially defines a second pin hole; and a closure rotor blade positioned in the gate portion of the annular slot between the first auxiliary rotor blade and the second auxiliary rotor blade, the closure rotor blade having a closure mounting portion that is in contact with the first fixturing tab and the second fixturing tab, and wherein the closure rotor blade partially defines the first pin hole and the second pin hole.

The rotor assembly as in any preceding clause, wherein the first auxiliary mounting portion comprises a first auxiliary platform, a first auxiliary dovetail, and a first auxiliary neck extending between the first auxiliary platform and the first auxiliary dovetail.

The rotor assembly as in any preceding clause, wherein the first fixturing tab extends from the first auxiliary neck.

The rotor assembly as in any preceding clause, wherein the first pin hole is partially defined by the first auxiliary platform.

The rotor assembly as in any preceding clause, wherein a first recess is defined in the first auxiliary neck portion radially outwardly of the first fixturing tab.

The rotor assembly as in any preceding clause, wherein the second auxiliary mounting portion comprises a second auxiliary platform, a second auxiliary dovetail, and a second auxiliary neck extending between the second auxiliary platform and the second auxiliary dovetail.

The rotor assembly as in any preceding clause, wherein the second fixturing tab extends from the second auxiliary neck.

The rotor assembly as in any preceding clause, wherein a second recess is defined in the second auxiliary neck portion radially outwardly of the second fixturing tab.

The rotor assembly as in any preceding clause, wherein the second pin hole is partially defined by the second auxiliary platform.

The rotor assembly as in any preceding clause, wherein the closure mounting portion comprises a closure platform, a closure dovetail, and a closure neck extending between the closure platform and the closure dovetail.

The rotor assembly as in any preceding clause, wherein the closure dovetail contacts the first fixturing tab and the second fixturing tab.

The rotor assembly as in any preceding clause, wherein the closure platform partially defines the first pin hole and the second pin hole.

The rotor assembly as in any preceding clause, wherein a first pin is disposed in the first pin hole, and wherein a second pin is disposed in the second pin hole.

A steam turbine comprising: a casing; and a rotor assembly disposed in the casing, the rotor assembly comprising: a rotor defining an annular slot that includes a main portion and a gate portion; a plurality of rotor blades positioned in the annular slot, the plurality of rotor blades including a standard group of rotor blades and a closure group of rotor blades, the standard group of rotor blades positioned in the main portion of the annular slot, and wherein the closure group of rotor blades comprises: a first auxiliary rotor blade having a first auxiliary mounting portion that includes a first fixturing tab, and wherein the first auxiliary mounting portion partially defines a first pin hole; a second auxiliary rotor blade having a second auxiliary mounting portion that includes a second fixturing tab, and wherein the second auxiliary mounting portion partially defines a second pin hole; and a closure rotor blade positioned in the gate portion of the annular slot between the first auxiliary rotor blade and the second auxiliary rotor blade, the closure rotor blade having a closure mounting portion that is in contact with the first fixturing tab and the second fixturing tab, and wherein the closure rotor blade partially defines the first pin hole and the second pin hole.

The steam turbine as in any preceding clause, wherein a first pin is disposed in the first pin hole, and wherein a second pin is disposed in the second pin hole.

The steam turbine as in any preceding clause, wherein the first auxiliary mounting portion comprises a first auxiliary platform, a first auxiliary dovetail, and a first auxiliary neck extending between the first auxiliary platform and the first auxiliary dovetail, wherein the first fixturing tab extends from the first auxiliary neck.

The steam turbine as in any preceding clause, wherein the second auxiliary mounting portion comprises a second auxiliary platform, a second auxiliary dovetail, and a second auxiliary neck extending between the second auxiliary platform and the second auxiliary dovetail, wherein the second fixturing tab extends from the second auxiliary neck.

A method of installing a plurality of rotor blades in a rotor, the plurality of rotor blades including a standard group of rotor blades and a closure group of rotor blades, the method comprising: inserting each standard rotor blade in the group of standard rotor blades through a gate portion of an annular slot and into a main portion of the annular slot; inserting a first auxiliary rotor blade through the gate portion of the annular slot and into the main portion of the annular slot, the first auxiliary rotor blade having a first auxiliary mounting portion that includes a first fixturing tab, and wherein the first auxiliary mounting portion partially defines a first pin hole; inserting a second auxiliary rotor blade through the gate portion of the annular slot and into the main portion of the annular slot, the second auxiliary rotor blade having a second auxiliary mounting portion that includes a second fixturing tab, and wherein the second auxiliary mounting portion partially defines a second pin hole; and inserting a closure rotor blade through the gate portion until a closure mounting portion of the closure rotor blade contacts the first fixturing tab and the second fixturing tab, wherein the closure rotor blade partially defines the first pin hole and the second pin hole.

The method as in any preceding clause, wherein inserting each of the standard rotor blades, the first auxiliary rotor blade, and the second auxiliary rotor blade comprises: inserting one of the standard rotor blades, the first auxiliary rotor blade, or the second auxiliary rotor blade through the gate; rotating the one of the standard rotor blades, the first auxiliary rotor blade, or the second auxiliary rotor blade through the gate; and moving the one of the standard rotor blades, the first auxiliary rotor blade, or the second auxiliary rotor blade through the gate from the gate portion to the main portion after the rotating step.

The method as in any preceding clause, further comprising: installing the closure group in a fixture by: positioning an inner surface of the first auxiliary rotor blade and an inner surface of the second auxiliary rotor blade on the fixture, wherein the inner surface of the first auxiliary rotor blade and the inner surface of the second auxiliary rotor blade are parallel; and positioning the closure blade between the first auxiliary rotor blade and the second auxiliary rotor blade such that the closure blade contacts the first fixturing tab and the second fixturing tab; and machining the first pin hole and the second pin hole.

What is claimed is:

1. A rotor assembly comprising:

a rotor defining an annular slot that includes a main portion and a gate portion;

a plurality of rotor blades positioned in the annular slot, the plurality of rotor blades including a standard group of rotor blades and a closure group of rotor blades, the standard group of rotor blades positioned in the main portion of the annular slot, and wherein the closure group of rotor blades comprises:

a first auxiliary rotor blade having a first auxiliary mounting portion that includes a first fixturing tab, and wherein the first auxiliary mounting portion partially defines a first pin hole;

a second auxiliary rotor blade having a second auxiliary mounting portion that includes a second fixturing tab, and wherein the second auxiliary mounting portion partially defines a second pin hole; and a closure rotor blade positioned in the gate portion of the annular slot between the first auxiliary rotor blade and the second auxiliary rotor blade, the closure rotor blade having a closure mounting portion defining a radially innermost surface, the radially innermost surface being in contact with the first fixturing tab and the second fixturing tab, and wherein the closure rotor blade partially defines the first pin hole and the second pin hole.

2. The rotor assembly as in claim 1, wherein the first auxiliary mounting portion comprises a first auxiliary platform, a first auxiliary dovetail, and a first auxiliary neck extending between the first auxiliary platform and the first auxiliary dovetail.

3. The rotor assembly as in claim 2, wherein the first fixturing tab extends from the first auxiliary neck.

4. The rotor assembly as in claim 2, wherein the first pin hole is partially defined by the first auxiliary platform.

5. The rotor assembly as in claim 2, wherein a first recess is defined in the first auxiliary neck portion radially outwardly of the first fixturing tab.

6. The rotor assembly as in claim 1, wherein the second auxiliary mounting portion comprises a second auxiliary platform, a second auxiliary dovetail, and a second auxiliary neck extending between the second auxiliary platform and the second auxiliary dovetail.

7. The rotor assembly as in claim 6, wherein the second fixturing tab extends from the second auxiliary neck.

8. The rotor assembly as in claim 6, wherein a second recess is defined in the second auxiliary neck portion radially outwardly of the second fixturing tab.

9. The rotor assembly as in claim 6, wherein the second pin hole is partially defined by the second auxiliary platform.

10. The rotor assembly as in claim 1, wherein the closure mounting portion comprises a closure platform, a closure dovetail, and a closure neck extending between the closure platform and the closure dovetail.

11. The rotor assembly as in claim 10, wherein the closure platform partially defines the first pin hole and the second pin hole.

12. The rotor assembly as in claim 1, wherein a first pin is disposed in the first pin hole, and wherein a second pin is disposed in the second pin hole.

13. A steam turbine comprising:

a casing; and a rotor assembly disposed in the casing, the rotor assembly comprising:

a rotor defining an annular slot that includes a main portion and a gate portion;

a plurality of rotor blades positioned in the annular slot, the plurality of rotor blades including a standard group of rotor blades and a closure group of rotor blades, the standard group of rotor blades positioned in the main portion of the annular slot, and wherein the closure group of rotor blades comprises:

a first auxiliary rotor blade having a first auxiliary mounting portion that includes a first fixturing tab, and wherein the first auxiliary mounting portion partially defines a first pin hole;

a second auxiliary rotor blade having a second auxiliary mounting portion that includes a second fixturing tab, and wherein the second auxiliary mounting portion partially defines a second pin hole; and a closure rotor blade positioned in the gate portion of the annular slot between the first auxiliary rotor blade and the second auxiliary rotor blade, the closure rotor blade having a closure mounting portion defining a radially innermost surface, the radially innermost surface being in contact with the first fixturing tab and the second fixturing tab, and wherein the closure rotor blade partially defines the first pin hole and the second pin hole.

14. The steam turbine as in claim 13, wherein a first pin is disposed in the first pin hole, and wherein a second pin is disposed in the second pin hole.

15. The steam turbine as in claim 13, wherein the first auxiliary mounting portion comprises a first auxiliary platform, a first auxiliary dovetail, and a first auxiliary neck extending between the first auxiliary platform and the first auxiliary dovetail, wherein the first fixturing tab extends from the first auxiliary neck.

16. The steam turbine as in claim 13, wherein the second auxiliary mounting portion comprises a second auxiliary platform, a second auxiliary dovetail, and a second auxiliary neck extending between the second auxiliary platform and the second auxiliary dovetail, wherein the second fixturing tab extends from the second auxiliary neck.

17. A method of installing a plurality of rotor blades in a rotor, the plurality of rotor blades including a standard group of rotor blades and a closure group of rotor blades, the method comprising:

inserting each standard rotor blade in the group of standard rotor blades through a gate portion of an annular slot and into a main portion of the annular slot;

inserting a first auxiliary rotor blade through the gate portion of the annular slot and into the main portion of the annular slot, the first auxiliary rotor blade having a first auxiliary mounting portion that includes a first fixturing tab, and wherein the first auxiliary mounting portion partially defines a first pin hole;

inserting a second auxiliary rotor blade through the gate portion of the annular slot and into the main portion of the annular slot, the second auxiliary rotor blade having a second auxiliary mounting portion that includes a second fixturing tab, and where in the second auxiliary mounting portion partially defines a second pin hole; and inserting a closure rotor blade through the gate portion until a radially inner most surface of a closure mounting portion of the closure rotor blade contacts the first fixturing tab and the second fixturing tab, wherein the closure rotor blade partially defines the first pin hole and the second pin hole.

18. The method as in claim 17, wherein inserting each of the standard rotor blades, the first auxiliary rotor blade, and the second auxiliary rotor blade comprises:

inserting one of the standard rotor blades, the first auxiliary rotor blade, or the second auxiliary rotor blade through the gate;

rotating the one of the standard rotor blades, the first auxiliary rotor blade, or the second auxiliary rotor blade through the gate; and moving the one of the standard rotor blades, the first auxiliary rotor blade, or the second auxiliary rotor blade through the gate from the gate portion to the main portion after the rotating step.

19. The method as in claim 17, further comprising:

installing the closure group in a fixture by:

positioning an inner surface of the first auxiliary rotor blade and an inner surface of the second auxiliary rotor blade on the fixture, wherein the inner surface of the first auxiliary rotor blade and the inner surface of the second auxiliary rotor blade are parallel; and positioning the closure blade between the first auxiliary rotor blade and the second auxiliary rotor blade such that the closure blade contacts the first fixturing tab and the second fixturing tab; and machining the first pin hole and the second pin hole.

20. The rotor assembly as in claim 1, wherein a first radial gap is defined between a floor of the rotor and a first inner surface of the first auxiliary mounting portion, wherein a second radial gap is defined between the floor and the inner surface of the closure mounting portion, and wherein the second radial gap is larger than the first radial gap.

* * * * *